US009417929B2

(12) United States Patent
Fonseca et al.

(10) Patent No.: US 9,417,929 B2
(45) Date of Patent: Aug. 16, 2016

(54) RUNTIME PROFILE DETERMINATIONS OF VIRTUAL MACHINES FOR GRAPHICS PROCESSING UNIT (GPU) ALLOCATION

(71) Applicant: VMware, Inc., Palo Alto, CA (US)

(72) Inventors: Jose Fonseca, London (GB); Salim Abiezzi, Sammamish, WA (US)

(73) Assignee: VMware, Inc., Palo Alto, CA (US)

( * ) Notice: Subject to any disclaimer, the term of this patent is extended or adjusted under 35 U.S.C. 154(b) by 618 days.

(21) Appl. No.: 13/723,035

(22) Filed: Dec. 20, 2012

(65) Prior Publication Data

US 2014/0181807 A1    Jun. 26, 2014

(51) Int. Cl.
G06F 9/46       (2006.01)
G06F 9/455      (2006.01)
G06F 9/50       (2006.01)

(52) U.S. Cl.
CPC .......... *G06F 9/5083* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,506,265 | B1* | 3/2009 | Traut et al. | 715/763 |
| 7,865,638 | B1* | 1/2011 | Wyatt | 710/56 |
| 7,898,554 | B2* | 3/2011 | Brichter et al. | 345/660 |
| 8,166,473 | B2* | 4/2012 | Kinsey et al. | 718/1 |
| 8,341,624 | B1* | 12/2012 | Hobbs | 718/1 |
| 8,544,005 | B2 | 9/2013 | Lection et al. | |
| 2007/0008324 | A1* | 1/2007 | Green | 345/501 |
| 2010/0115510 | A1 | 5/2010 | Ford et al. | |
| 2011/0083131 | A1 | 4/2011 | Pirzada et al. | |
| 2012/0069032 | A1* | 3/2012 | Hansson et al. | 345/522 |
| 2012/0254439 | A1 | 10/2012 | Yamasaki et al. | |
| 2013/0239119 | A1* | 9/2013 | Garg et al. | 718/105 |
| 2013/0339568 | A1* | 12/2013 | Corrie | 711/6 |
| 2014/0181806 | A1* | 6/2014 | Abiezzi et al. | 718/1 |

OTHER PUBLICATIONS

Vishakha, G. et al.; "Pegasus: Coordinated Scheduling for Virtualized Accelerator-based Systems," USENIX ATC'11 Proceedings of the 2011 USENIX conference on USENIX annual technical conference.
International Search Report, PCT/US2013/076854, Dec. 20, 2013.
Vishakha, G. et al., "Pegasus: Coordinated Scheduling for Virtualzied Accelerator=base dSsytems Niraj Tolia Maginatics Vanish Talwar HP Labs", Jan. 1, 2011, XP055108443, Retrieved from the InternetZ: URL:citeseerx.ist.psu.edu/viewdoc/download?DOI=10.1.1.306.9999&rep=rep1&type=pdf [retrieved on Mar. 18, 2014], pp. 3-5, Figure 1, p. 9.
International Searching Authority, International Application No. PCT/US20138/076854 filed Dec. 20, 2013, "Notification of the International Search Report and the Written Opinion of the International Searching Authority, of the Declaration; International Search Report and Written Opinion of the International Search Authority", mailed Apr. 7, 2014, 13 pages.

\* cited by examiner

*Primary Examiner* — Meng An
*Assistant Examiner* — Bradley Teets

(57) ABSTRACT

Methods, techniques, and systems for dynamically allocating graphics processing units among virtual machines are provided. Example embodiments provide a dynamic GPU allocation system ("DGAS"), which enables the efficient allocation of physical GPU resources to one or more virtual machines. In one embodiment, the DGAS determines runtime profiles of a plurality of virtual machines. The runtime profiles are determined by determining a runtime assessment of workload indicative of a potential benefit that the virtual machine can receive from using a GPU resource. The DGAS then causes the processing bandwidth of the physical GPU resources to be allocated to some of the plurality of virtual machines based upon the dynamically determined runtime assessments of workload.

22 Claims, 9 Drawing Sheets

| 401 | 402 | 403 | 404 | 405 |
|---|---|---|---|---|
| 1 | VM-8 | Priority 2 | GBF 6 | 512 MB |
| 2 | VM-13 | Priority 2 | GBF 3 | 512 MB |
| 3 | VM-9 | Priority 2 | GBF 2 | 1 GB |
| 4 | VM-6 | Priority 2 | GBF 1 | 2 GB |
| 5 | VM-1 | Priority 1 | GBF 6 | 512 MB |
| 6 | VM-11 | Priority 1 | GBF 6 | 2 GB |
| 7 | VM-7 | Priority 0 | GBF 6 | 1 GB |
| 8 | VM-3 | Priority 0 | GBF 5 | 256 MB |
| 9 | VM-5 | Priority 1 | GBF 4 | 256 MB |
| 10 | VM-16 | Priority 0 | GBF 3 | 256 MB |
| 11 | VM-15 | Priority 0 | GBF 3 | 256 MB |
| 12 | VM-2 | Priority 0 | GBF 2 | 128 MB |
| 13 | VM-14 | Priority 0 | GBF 2 | 256 MB |
| 14 | VM-12 | Priority 0 | GBF 2 | 256 MB |
| 15 | VM-4 | Priority -1 | GBF 5 | 256 MB |
| 16 | VM-10 | Priority -1 | GBF 5 | 256 MB |

Ex. GBF Key
6 = 3D
5 = GPGPU
4 = 2.5D
3 = Video
2 = 2D
1 = No GPU acc.

Ex. Priority Key
2 = OVERRIDE
1 = HIGH
0 = DEFAULT
-1 = BOTTOM

*Fig. 4*

RUNTIME PROFILE DETERMINATIONS OF VIRTUAL MACHINES FOR GRAPHICS PROCESSING UNIT (GPU) ALLOCATION

TECHNICAL FIELD

The present disclosure relates to methods, techniques, and systems for virtualizing graphics processing units and, in particular, to methods, techniques, and systems for efficiently allocating graphics processing units dynamically based upon virtual machine workload.

BACKGROUND

A graphics processing unit (GPU) can be a useful resource to accomplish activities such as accelerating three dimensional (3D) graphics and video processing due to the parallel computing nature of these tasks. More specifically, the highly parallel structure of a GPU makes it more effective than a general-purpose CPU for algorithms that process large blocks of data in parallel such as 3D graphics that involve, for example, transforms, lighting, textures, shading, etc. In computing systems that contain both a computer processor unit (CPU) and a GPU, computations such as 3D graphics or motion compensation performed for video decoding, that are simple, repetitive, high throughput, and not as latency sensitive can be offloaded to a GPU in order to provide faster computations and leave more room for other tasks to be processed by the CPU.

A typical computing system is expected to have a much larger number of CPU cores than GPUs. GPUs come in a variety of forms. A GPU might be integrated with the CPU on the same chip and share system memory or may be made available on a separate card connected to the CPU and memory through, for example, a PCI (Peripheral Controller Interface) bus.

BRIEF DESCRIPTION OF THE DRAWINGS

FIG. 4 is a block diagram of an example GPU allocation list (GAL) used with an example dynamic GPU allocation system.

DETAILED DESCRIPTION

Figure 1:
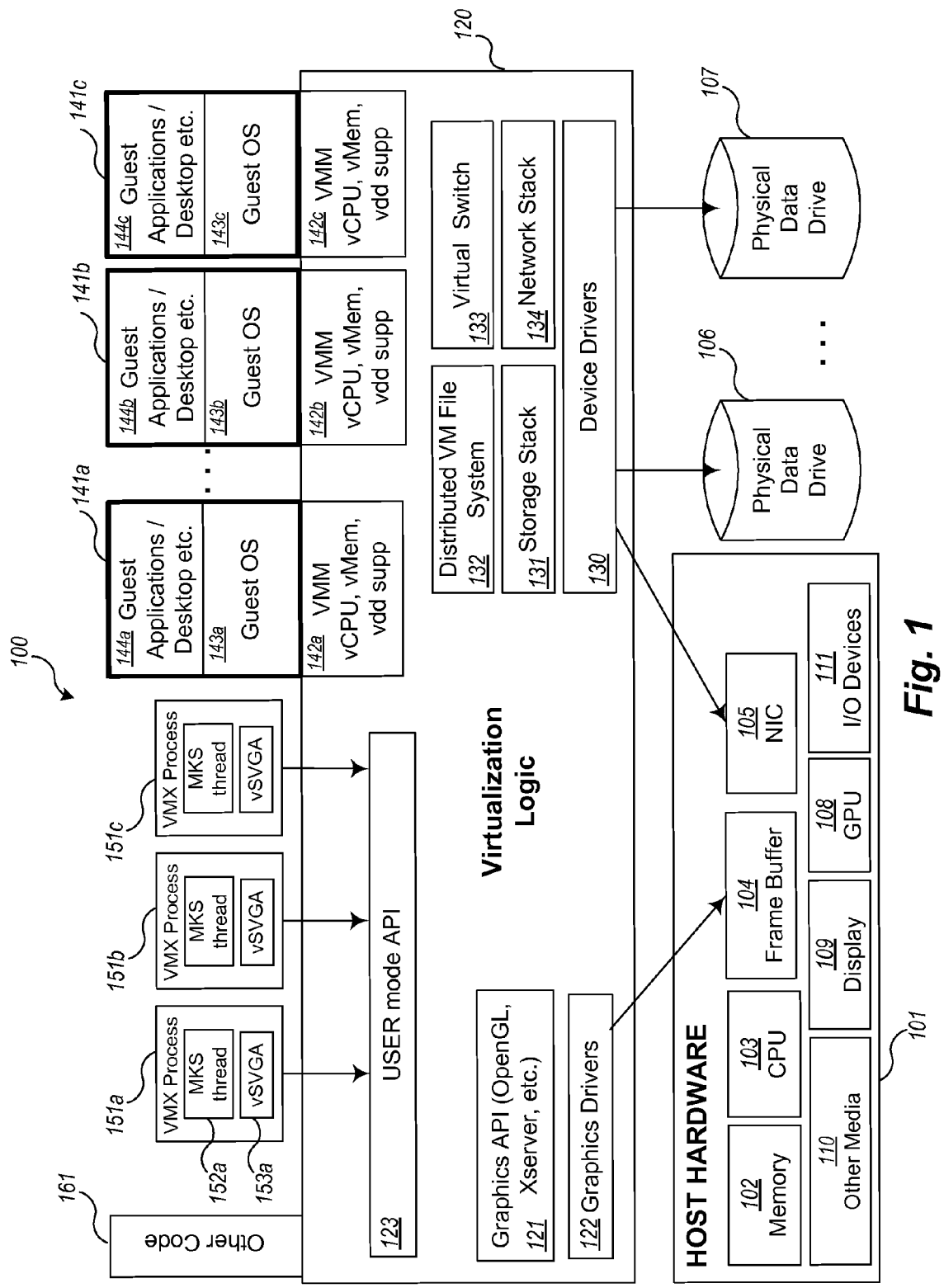
FIG. 1 is a block diagram of an example virtualization server computing system for executing example embodiments of a dynamic GPU allocation system.

Embodiments described herein provide enhanced computer- and network-based methods, techniques, and systems for dynamically allocating resources of physical graphics processing units among virtual machines. Example embodiments provide a dynamic GPU allocation system (DGAS), which enables efficient allocation of physical GPU resources to one or more virtual machines.

In overview, the DGAS associates each virtual machine with a GPU benefit factor (a GBF), which is a measurement of the potential benefit a virtual machine may attain from use of one or more GPUs. The DGAS then uses the GBFs assigned to the virtual machines to allocate physical GPU resources as discussed in detail below to a set of those VMs that would seem to gain the greatest benefit. For example, a higher GBF may be assigned to a virtual machine that processes true 3D graphics than a virtual machine that processes mostly 2D graphics or video. Each virtual machine may also be associated with a statically determined (predetermined, designated, pre-assigned, etc.) priority, set for example by an administrator-user or the like. In at least one embodiment, this static priority is used to override the GPU resource allocation that would otherwise occur by the DGAS just taking into account the GBF. The administrator-user can thereby insure that physical GPU resources are allocated to particular users or virtual machines, such as a computer-aided design engineer, mechanical project manager, or architect, who may need such resources to run 3D design applications, for example, as part of his or her job.

In example embodiments, the DGAS comprises virtualization logic running on one or more server computing systems that computes GPU benefit factors for the virtual machines on a dynamic basis, and combines the computed GBFs with the corresponding static priorities of the virtual machines to determine an initial ranked ordering of virtual machines. In some embodiments, a runtime profile of each virtual machine is used to further adjust its GBF and the ranked ordering of the virtual machine adjusted accordingly. The runtime profile provides some measurement of GPU usage effectiveness based upon the workload running on a virtual machine, such as based upon video memory usage, load of the command queue, bus bandwidth usage and/or other measurement. Accordingly, a runtime profile can provide a type of "tiebreaker" when the GBF and priority of two or more virtual machines result in the same ranking. In some embodiments, a data structure such as a GPU allocation list (GAL) is used to manage and maintain the rank ordering of the virtual machines for allocation purposes.

Once the VMs are ranked according to their GBFs and potentially priorities and runtime profiles, the available hardware GPU resources of the one or more server computing systems are then allocated by, for example, by GPU allocation logic, to some subset of these virtual machines in rank order, the subset determined as those virtual machines that will fit on the GPUs, for example based upon matching physical GPU capacity (e.g., video memory availability) with the requirements of the subset of virtual machines (e.g., video memory requirements). Hardware GPU resources are then assigned to the determined subset of virtual machines commensurate with the (physical) GPU resource allocations. Because the GBFs are determined (e.g., computed, calculated, received, etc.) and adjusted dynamically (e.g., while a current subset of VMs is running on the server computing systems), the allocation of GPU resources can vary over time, resulting in better utilization of GPU resources, and hence a more optimally performing and well balanced system. Although allocation is described herein based upon a rank ordering of virtual machines, in some embodiments, allocation is based upon a comparison of requirements with some or no regard to ranking (for example, based upon a first-come, first-serve approach).

FIG. 1 is a block diagram of an example virtualization server computing system for executing example embodiments of a dynamic GPU allocation system. Virtualization server computing system 100 may be configured on a personal computer, a laptop, or server (host) hardware platform 101, such as an x86 architecture platform. Note that a general purpose or a special purpose computing system suitably instructed may be used to implement the virtualization server computing system 100. The virtualization server computing system 100 may comprise one or more server computing systems and may span distributed locations. In addition, each block shown may represent one or more such blocks as appropriate to a specific embodiment or may be combined with other blocks.

In the embodiment illustrated, host hardware platform 101 may comprise a computer memory 102, one or more central processing units ("CPU") 103, a frame buffer ("FB") 104, and one or more network connections, accessible for example via network interface card ("NIC") 105. In addition, the host hardware platform 101 may optionally comprise other components such as one or more displays 109, graphics processing units ("GPU") 108, input/output ("I/O") devices 111 (e.g., keyboard, mouse, CRT or LCD display, etc.), or other computer readable media 110.

Virtualization logic 120 is loaded into memory 102 of host hardware platform 101 and may execute on one or more CPUs 103. Virtualization logic 120 may alternatively be implemented in software, hardware, or firmware, or some combination thereof. Virtualization logic 120, includes one or more virtual machine monitors (VMM) 142a-142c and VMX processes 151a-151c, which can support multiple virtual machines (VM) 141a-141c that can concurrently be instantiated and executed. As used herein a "virtual machine" or VM is an abstraction representing the execution space that a guest operating system and applications (the "guest") may execute within, such as VM 141a-141c. Each virtual machine 141a-141c may include a guest operating system (guest OS), e.g., guest OSes 143a-143c, and one or more corresponding applications, e.g., guest applications 144a-144c, running on each respective guest OSes 143a-143c. In one example embodiment, each VM, when executing, is made accessible to a different user who is remotely connected from a different client connection. The number of VMs supported by any particular host may vary, for example, based on aspects such as the hardware capabilities, virtualization logic configurations, and desired performance. Other code 161 may also execute on virtualization logic 120.

Each VM 141a-141c may require virtualization of one or more aspects implemented by the virtualization logic 120 and/or the host hardware platform 101. That is, the virtualization logic 120 may provide emulated hardware and drivers to each VM. For example, through the VMX processes 151a-151c and the VMMs 142a-142c, the virtualization logic 120 may provide one or more of a virtual CPU ("VCPU"), a virtual memory ("VMEM"), virtual device drivers ("VDD"), a virtual file system and virtual disks, virtual network capabilities, and virtual graphics capabilities, such as virtual graphics adaptors drivers and command emulation, and the like. Each virtualization environment may function as an equivalent of a standard x86 hardware architecture platform such that any operating system (e.g., Microsoft Windows®, Linux®, Solaris®86, NetWare, FreeBSD, etc.) may be installed as a guest OS (e.g., guest OS 143a-143c) to execute applications in an instantiated virtual machine. Note that in other embodiments, virtualization of other hardware architectures may be supported.

In one embodiment, the virtualization logic 120 provides virtualized storage support through a distributed VM file system 132, storage stack 131, and device drivers 130 that communicate with the physical data drives 106 and 107. In addition, the virtualization logic 120 provides virtualized network support through a virtual switch 133 and network stack 134 to communicate with NIC 105 of the host hardware platform 101. This support may be used to provide TCP/IP connections at the virtualization logic level to connect with other systems, such as to remote user interfaces or send video to client devices. Also, the virtualization logic 120 provides virtualized graphics support through the Super Video Graphics Array (SVGA) or VGA graphics adaptor implementations which use the server graphics API 121 (such as OpenGl, Xserver implementations, etc.) to communicate with graphics drivers 122 that manage and fill frame buffer 104 of the host hardware 101 using graphics commands. Other embodiments may provide virtualized graphics support in other manners using other communications mechanisms. In some embodiments such as those described herein, the graphics capabilities of the host hardware platform 101 may be accelerated through the use of one or more GPUs 108. Also, although many of the examples described herein are oriented to accelerating graphics and video using GPUs, in some embodiments, other types of (non-graphics) computing, for example, code written using the OpenCL framework, may also be accelerated through the use of one or more GPUs 108.

In some embodiments, the virtualization execution environments are provided through both a process executing at USER (less privileged mode), referred to as the VMX process (e.g., VMX processes 151a-151c) and the VMM executing in a more privileged state (e.g., VMMs 142a-142c). Each VM 141a-141c effectively executes in the process space of its respective VMX process 151a-151c (that is its memory is mapped to each respective VMX process). A VMX process, for example processes 151a-151c, may comprise an MKS (mouse, keyboard, screen) thread (e.g., thread 152a) for processing input and output from the respective VM, e.g., VMs 141a-141c. A VMX process also includes USER mode graphics level support, such as a virtual SVGA driver 153a. The SVGA driver 153a is used to send graphics commands (through the graphics API 121) to the graphics drivers of the virtualization logic 120. As described herein, these commands may ultimately run on one or more GPUs 108 when the corresponding VM has been allocated one or more GPUs 108. Each VMX process and VMM pair cooperate to provide the effective (and isolated) virtualization execution environment for each VM to run. In general operation, the virtualization logic 120 receives requests from the virtualized device drivers implemented by the VMMs and VMX processes, translates (or otherwise transfers, forwards, sends, or communicates) these requests to corresponding requests to real device drivers 130 or 122 that communicate with real devices resident in the host hardware platform 101 (such as frame buffer 104, NIC 105, etc.).

The various terms, layers, categorizations, components used to describe the virtualization server computing system 100 of FIG. 1 may be referred to differently without departing from their functionality or the spirit of this disclosure. Also, one or more of the components may not be present in any specific implementation. For example, the virtual components shown as part of virtualization logic 120 that are not included in each VMM 142a-142c (for example, one or more of components 130-134, 121-122, or the like) may be considered in other embodiments to be part of the VMMs 142a-142c. In addition, in some embodiments, no VMX process is used and the MKS thread capabilities and virtual graphics adaptor support are integrated instead into the VMMs 142a-142c or into other parts of the virtualization logic 120. Also, in some embodiments the VMMs 142a-142c may be considered to be separate from or part of the VM 141a-141c. Embodiments of a DGAS may be practiced in other virtualized computing environments such as hosted virtual machine systems, where the virtualization logic 120 is implemented on top of an operating system executing on host hardware platform 101 instead of directly on the host hardware.

Furthermore, in some embodiments, some or all of the components of the virtualization server computing system 100 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the components and/or data structures may also be stored as contents (e.g., as executable or other machine-readable software instructions or structured data) on a tangible or non-transitory computer-readable medium (e.g., a hard disk; memory; network; other computer-readable medium; or other portable media article to be read by an appropriate drive or via an appropriate connection, such as a DVD or flash memory device) such as computer readable medium 110 to enable the computer-readable medium to execute or otherwise use or provide the contents to perform at least some of the described techniques.

Figure 2:
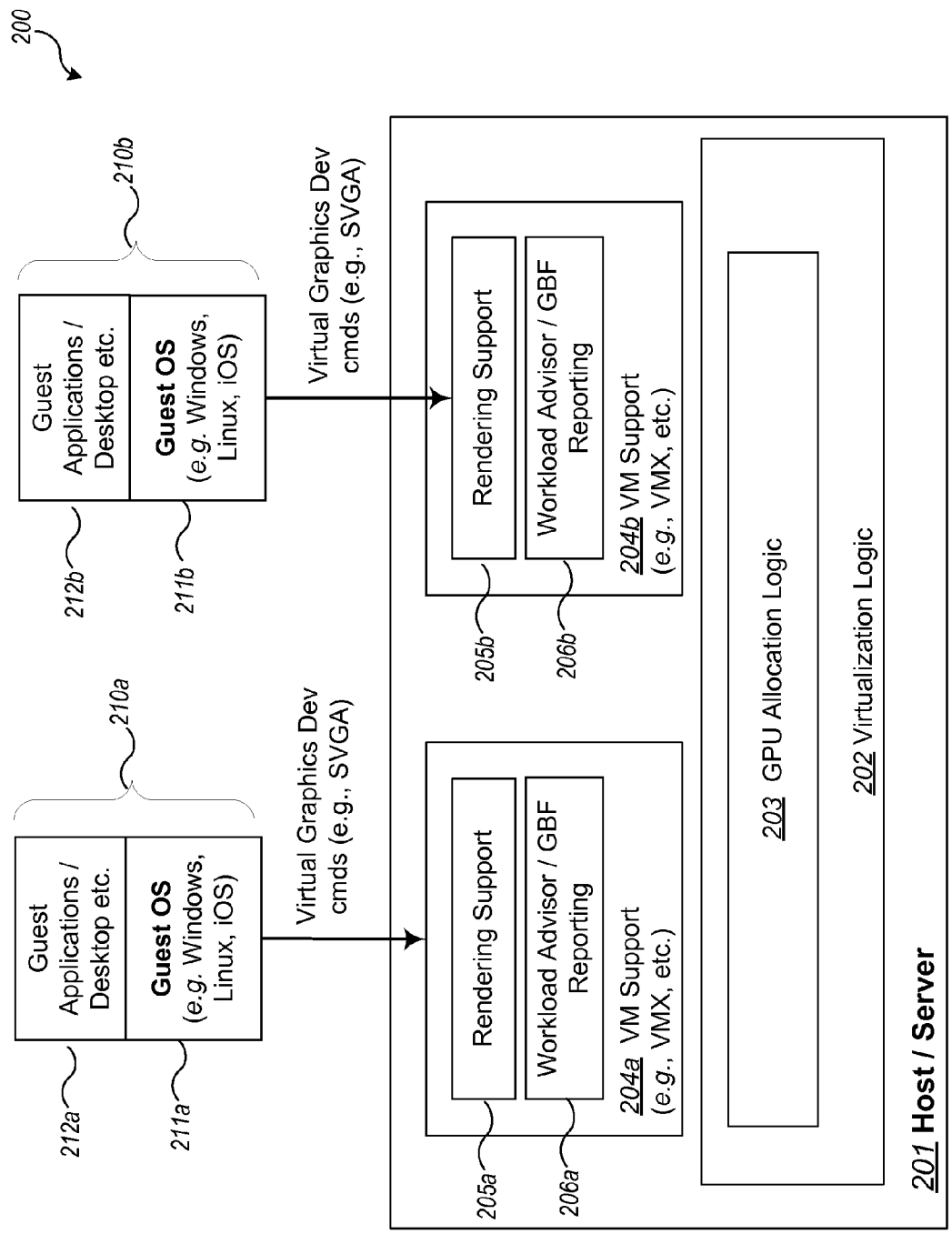
FIG. 2 is an example block diagram of components of an example dynamic GPU allocation system.

FIG. 2 is an example block diagram of components of an example dynamic GPU allocation system. In one embodiment, the dynamic GPU allocation system (DGAS) comprises one or more functional components/modules that work together to dynamically allocate physical GPU resources among a set of virtual machines as overviewed above. These components may be implemented in software, hardware, firmware, or a combination. In FIG. 2, the DGAS comprises server side support that resides on one or more host or server computing systems 201. In other embodiments, there may be some amount of support that resides in different locations to provide up-to-date reporting of runtime profile information such as workload or planned workload factors.

In an example embodiment, the server side support includes GPU allocation logic 203 for maintaining a ranked list of virtual machines to which physical GPU resources may be allocated (the GAL), for determining which virtual machines should be allocated some or all of the available GPU resources, and for performing the allocation and de-allocation of hardware GPU support to virtual GPUs (or equivalent communication mechanism) of the virtual machines. In some embodiments, other communication mechanisms (such as sockets, pipes, and the like) are used instead of virtual GPUs, although for ease of description, the term virtual GPU is used for describing an allocation of physical GPU resources. As shown, the GPU allocation logic 203 may execute as part of the virtualization logic 202 or may be provided in whole or in part by other aspects of the computing system running on one or more host/servers 201 such as by distributed logic running on each host/server 201 that communicates to allocate physical GPUs across servers (such as to support VMs that are moved or migrated). In addition, such distributed logic may be configured to allocate GPUs from multiple host/servers to a single VM.

In addition, in some embodiments, the server side support includes a workload advisor/GBF reporting component for each virtual machine, e.g., advisor/GBF reporting components 206a-206b, for reporting data used to manage profile information, and rendering support, e.g., rendering support logic 205a-205b, for assisting VMs (through API, libraries, commands, etc.) to take advantage of the parallelism available with use of GPUs. In some embodiments, these components execute as part of the VM Support 204a-204b, for example, as part of a process (e.g., a VMX process in VMware's virtualization environment) that executes on virtualization logic 202, which is hosted by one or more host/server computing systems 201. For example, the components 204a-206a and 204b-206b may execute as part of an MKS (mouse, keyboard, screen handling) thread 152a, which executes as part of VMX processes 151a-151c as described with reference to FIG. 1. In other embodiments, these components may be implemented in other parts of the virtualization environment such as part of each VMM (virtual machine monitor, e.g., VMMs 142a-142c) or as other parts of virtualization logic 202. The rendering support 205a and 205b is responsible for receiving the virtual graphics device commands from guest 210a and 210b (e.g., guest applications 212a and 212b executed from the desktop using the guest operating system 211a and 211b, respectively) and carrying them out through the graphics stack (shown in FIG. 1 as graphics API 121 and graphics drivers 122) to the graphics hardware associated with the host 201, such as frame buffer 104. The workload advisor/GBF reporting logic 206a and 206b is responsible for gathering and communicating information from each respective VM to use in computing the GBF for that VM. In some embodiments, the logic 206a and 206b also report factors used to determine a VM's runtime profile (describing or measuring the workload being processed on the VM), such as a measure of the video RAM (VRAM) used, the load of the command queue (e.g., an SVGA command queue or graphics command queue), the ratio of data transfers to all commands (e.g., the amount of DMA accesses to available bandwidth), and/or other measurements.

In example embodiments, the components of the server side support for the DGAS are implemented using standard programming techniques. In general, a range of programming languages known in the art may be employed for implementing such example embodiments, including using object-oriented, functional, scripting, and declarative languages. In addition, in other embodiments the functionality of the different components may be distributed amongst themselves in different ways or distributed in other ways, yet still achieve the functions of a DGAS.

Figure 3:
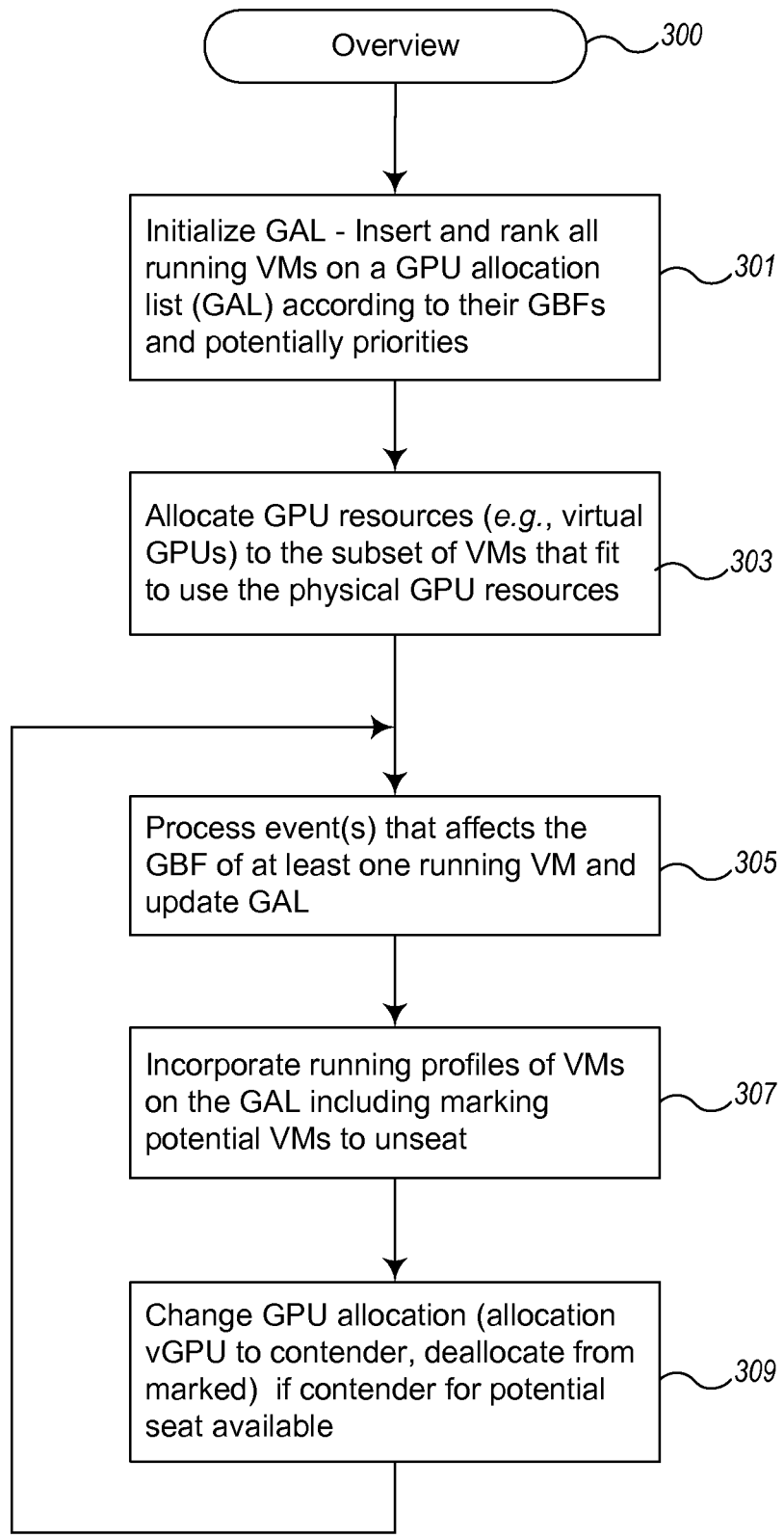
FIG. 3 is an example flow diagram of an overview of operations of an example dynamic GPU allocation system.

The components of the DGAS shown in FIG. 2 cooperate to dynamically allocate physical GPU resources among a set of virtual machines according to their GPU benefit factors and potentially other considerations. FIG. 3 is an example flow diagram of an overview of operations of an example dynamic GPU allocation system. The operations described with reference to FIG. 3 are described in further detail with reference to other figures that follow.

In block 301, the DGAS initializes the GPU allocation list (GAL) to insert and rank all running VMs according to their GPU benefit factors and, potentially, static priorities set by someone such as an administrator-user. The GAL can be any suitable data structure, for example a linked list, array, database, file, or the like, and may be stored in temporary or persistent storage. In one embodiment the GAL is a list of VMs, an abstraction of which is described with reference to FIG. 4.

The GPU benefit factor (GBF) of a virtual machine is calculated based upon the workload (or intended workload) of the virtual machine, such as the types of graphics and/or video commands that are being or intended to be processed. For example, different GPU benefit factors may be associated with VMs that perform or have historically performed 3D graphics, 2.5D graphics, video, 2D graphics, or that will not likely benefit from use of a GPU. Other GBFs may be defined for other situations and accommodated accordingly. For example, other non-graphics and non-video commands that may benefit from GPU acceleration, such as for highly parallel and/or repetitive algorithms (e.g., what is termed GPGPU processing or general purpose GPU processing), may also contribute to a GBF of a virtual machine. Initially (before much is known about the VM), the VM may be assigned a GBF based upon the kind of guest operating system and any history available about the applications that will be run or are intended to run on the VM. Over time, the GBF of a particular machine will "self correct" as the workload is better assessed, e.g., by determining a runtime profile of the VM.

In one example embodiment, a GBF may designate six different values that can be assigned to a virtual machine based upon different categorizations (e.g., computational profiles, classifications, and the like). According to one example categorization, VM that is performing three dimensional (3D) graphics is assigned a GBF of "6," a VM that is performing non-graphics, non-video computing that may benefit from GPU use (e.g., general purpose GPU computing, also called GPGPU computing) is assigned a GBF of "5," a VM that is performing two and a half dimensional (2.5D) graphics is assigned a GBF of "4," a VM that is encoding/decoding video is assigned a GBF of "3," a VM that is performing two dimensional (2D) graphics is assigned a GBF of "2," and a VM that is not performing the type of processing that would generally gain from GPU usage is assigned a default GBF of "1." Other embodiments may designate a fewer or greater number of GBF values or categorize workloads differently.

VMs performing 3D with a GBF of "6" are typically VMs that perform true 3D rendering such as MCAD (Mechanical Computer Aided Design) applications, Google Earth rendered in 3D mode, 3D games (such as Chess Titans), and the like. These VMs typically involve large numbers of 3D triangles that require lighting, texturing, and Z-buffering. Use of a GPU in such instances should make a material difference in improving the performance of these types of applications and their presentation quality.

VMs performing (non-graphics, non-video) computing that may benefit from GPU use (such as GPGPU applications) with a GBF of "5" are typically VMs that are running high performance computing applications such as those that require highly repetitive or parallel algorithms that contain building blocks capable of running (separately) on multiple processors. Modeling applications such as statistical regressions on very large data are examples of such applications. Additional examples include text search, encryption, mathematical analysis (such as finite element analysis or fluid dynamics, and the like). Some of these applications do not have real-time sensitivity and can be performed in "batch" mode. GPUs can be used to run such workloads in the off-work hours, after the graphics or video intensive VDI sessions terminate.

VMs performing 2.5D graphics with a GBF of "4" may include, for example, VMs running Windows with the "Aero" user interface turned on, including Flip 3D. Such user interfaces or similar applications may include a few triangles with texturing, however no lighting or Z-buffering. In addition, such applications may employ some image processing operations such as Gaussian Blur.

VMs performing video with a GBF of "3" may include, for example, VMs engaged in video playback, which are able to leverage the video decode or transcode capabilities of a GPU.

VMs performing 2D with a GBF of "2" may include, for example, VMs with desktop user interfaces that do not fall into any of the above categories. They may still benefit from GPU resources, for example, to speed up the encoding for remoting the user interface.

VMs that do not fall into any of the above categories with a default GBF of "1" may include VMs with workloads that would not likely gain much advantage from GPU acceleration. For example, VMs for database management, web serving, email serving, and the like, may fall into this category. Typically, applications that do not lend themselves to parallelization, overly complex, or are latency sensitive may fall into this category.

In some embodiments static priorities may also be set by a user, such as an administrator-user to guarantee certain behaviors in spite of the runtime flexibility affording by the GBFs. In one example embodiment, static priorities may designate one of four values: OVERRIDE, HIGH, DEFAULT, or BOTTOM. The OVERRIDE priority designation is used to indicate that the GBF ranking for a VM is to be overridden—physical GPU resources are to be allocated to the designated VM whenever available. This mechanism can be used, for example, to give preference to users of VMs running 3D applications that are critical to their jobs. It also supports an allocation mechanism that allows users to pay for guaranteed GPU support, such as in a public cloud or shared resource environment. In some embodiments, when the GPU allocation logic detects that a VM with an OVERRIDE priority is actually not making use of the GPU resources (such as a VM with a consistently low GBF as determined from its runtime profile) it may issue alerts or warnings to an administrator-user and/or inform the user of the VM that he or she is paying for unused resources. The HIGH priority designation is used to indicate a "tie-breaker" when two or more VMs with the same GBF are contending for the same GPU allocations. Thus, for example, a VM with a GBF of 6 and a priority of HIGH is "seated" (allocated GPU resources) before a VM with a GBF of 6 and a priority of DEFAULT. The BOTTOM priority designation is used to indicate that the VM should appear at the bottom of the GBF allocation list to be assigned "left-over" GPU resources. For example, such left-over GPU resources may be used for batch GPGPU workloads. The DEFAULT priority designation is assigned to any remaining VMs not assigned an OVERRIDE, a HIGH, or a BOTTOM priority. In this case VMs with identical GBFs may be randomly ordered.

In block 303, the DGAS determines which subset of VMs on the GPU allocation list can be allocated physical GPU resources based, for example, on which VMs of the ranked list will fit (require an amount of available resources) on the GPUs. An example allocation of a subset of VMs is described with reference to FIG. 5.

In blocks 305-309, the DGAS processes events and dynamically updates the GBF of running VMs and hence the GPU allocations. More specifically, in block 305, the DGAS process events, such as starting up a new VM, performing a migration of a running VM, etc., that affects the GBF of at least one VM. The DGAS then updates the GPU allocation list. Some events may result in downgrading a GBF of a particular VM. Other events may set an initial GBF for a VM to be initially run, moved, or run again, based, for example, on past history. An example processing of such events is described with reference to FIG. 8.

In block 307, the DGAS determines the runtime profiles of the VMs on the GPU allocation list, re-ranks them, and marks any VMs that can be potentially unseated (when a better contender becomes available) because their runtime profiles indicate that they are not really benefiting from GPU acceleration and not benefiting in an amount that is beyond a tolerable threshold (below or above depending upon how the measurement is performed). In general, only unseating a VM when a threshold is reached insures that the potential benefit of seating a new contender VM avoids the cost of the context switch between VMs. In effective embodiments, the switching between a VM's use of a CPU and use of a GPU needs to occur sufficiently quickly otherwise the potential gain in switching from one to another may be partially or completely compromised. An example determination of runtime profiles is described with reference to FIG. 7.

In block 309, the DGAS changes the GPU resource allocation if warranted. That is, if viable contender VMs are available, then one or more of the VMs previously marked as potentially able to be unseated are unseated (have their GPU resource allocations de-allocated) and these resources are then given to one or more of the viable contender VMs.

The DGAS continues to execute the logic or processing events and handling dynamic GPU allocation by returning to block 305.

FIG. 4 is a block diagram of an example GPU allocation list (GAL) used with an example dynamic GPU allocation system. The diagram of FIG. 4 illustrates an abstraction of a GAL 400 and, as mentioned, may be implemented by any suitable data structure including for example a list, array, table, database, file, etc. The GAL 400 contains a list of VMs in a ranked order, where each row 410-425 indicates a rank 401, an identifier of a VM 402, an indicator of a priority 403, an indicator of a GPU benefit factor 404, and an indicator of requirements of that VM such as the amount of video random access memory (VRAM) 405. As shown, the priority indicator 403 indicates a value of "2" corresponding to a priority of OVERRIDE; a value of "1" corresponding to a priority of HIGH; a value of "-1" corresponding to a priority of BOTTOM; and a value of "0" corresponding to a priority of DEFAULT. In other embodiments, the indicator and/or values and/or number of discrete priorities may be different or modified. The VM identifier 402 is shown as a number, however this identifier could be of any form, including for example, text, numeric, mixed, or otherwise. The indicator 404 of the GBF is shown as a numeric value from "1" to "6" as described above; however, this indicator and/or values and/or number of discrete GBFs may be different or modified. The indicator 405 of VM requirements may indicate more than VRAM needs, or may not be present an all in the GAL 400 and may be computed or retrieved from an external resource. Again, the figure demonstrates one example of categorizations of GBF and a priority scheme.

Figure 5:
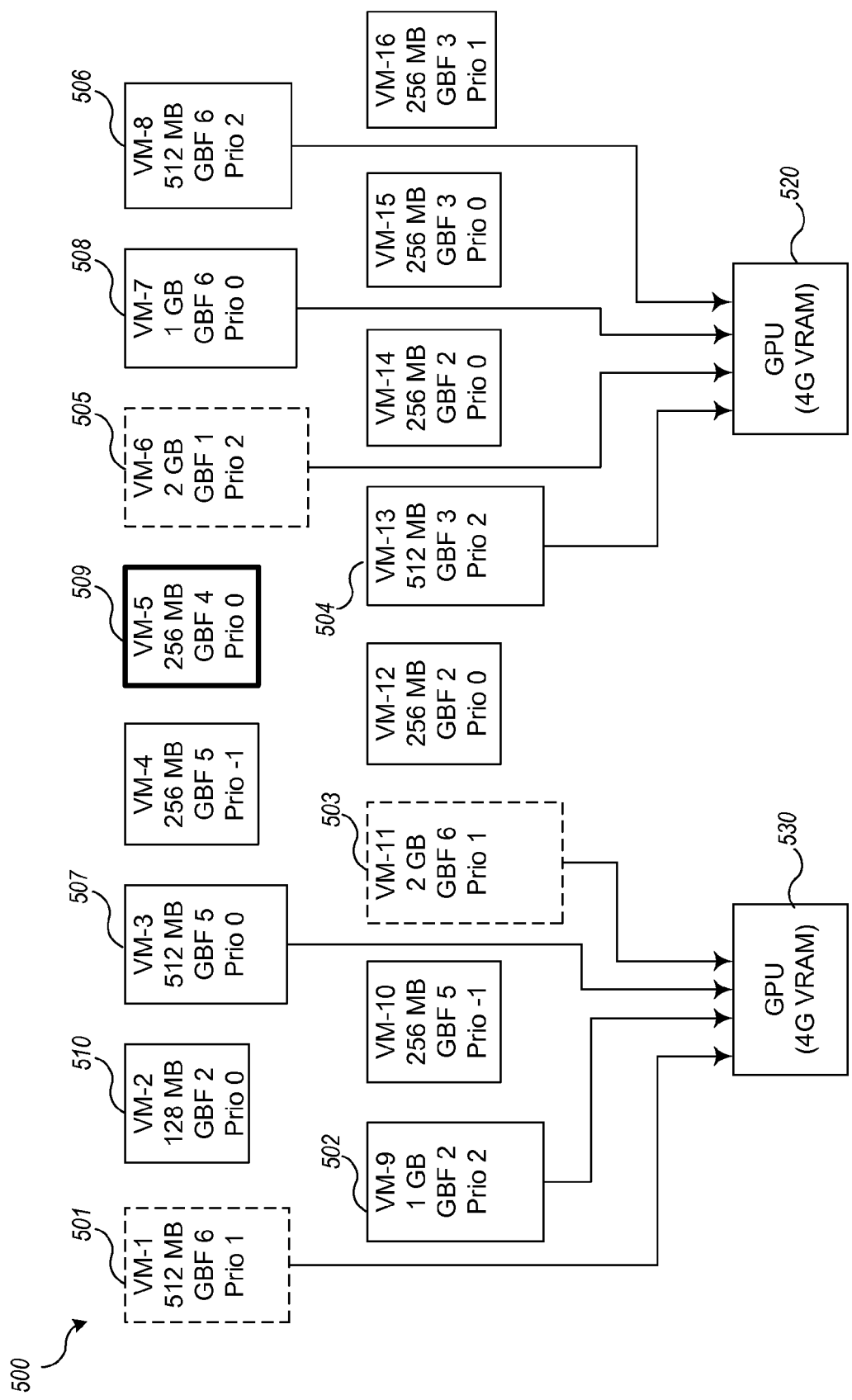
FIG. 5 depicts an example allocation of GPUs among an example set of virtual machines.

As described further with respect to FIG. 5, VMs are allocated GPU resources based, for example, on their position in the ranked ordering 401 in the GAL 400. When ranked as shown, when the GPU resources comprise two GPUs of 4 gigabytes each, then the VMs occupying "seats" 1-8 in the ranked order 401 can be allocated virtual resources (e.g., virtual GPU resources) that correspond to their portion of the physical GPU resources (or assigned to existing virtual resources when previously allocated). In FIG. 4, the subset of VMs 430 represents those VMs which have received an allocation of GPU resources. The subset of VMs 430 contains 4 VMs shown in rows 410-413 with an OVERRIDE priority; thus, they are allocated GPU resources first without regard to their corresponding GBFs. The subset of VMs 430 also contains 2 VMs shown in rows 414-415 with a HIGH priority and the same GBF of "6" (category assigned to VMs with a 3D type workload). The next VM shown in row 416 has the same GBF but a DEFAULT priority and thus appears after the VMs in rows 414-415. The subset of VMs 430 also contains 1 VM in row 417 with a DEFAULT priority and a GBF of "5." Thus, it can be seen that, in this embodiment, generally, VMs with an OVERRIDE priority will be considered for GPU resource allocations first, followed by those VMs with the highest GBFs, using a "HIGH" priority to break ties between them. Over time, the positions of the VMs on the GAL 400 may vary dynamically as the GBFs of these VMs are decreased or increased through evaluating the runtime profile of these VMs as described with reference to FIGS. 6A-6B and FIG. 7.

In some embodiments, a GBF may be used without a priority. Further, in other embodiments, the priority may be determined at other times other than when initializing, bringing up, or booting the system and may be retrieved by different methods, such as, for example, a property value stored in an initialization file, on a network resource, or the like.

Also, GAL 400 as illustrated includes all running VMs—those using GPU resources and those running on one or more CPUs. In some embodiments, separate lists are maintained for those VMs running on CPUs and those running on GPUs. The logic and handlers for maintaining such lists are correspondingly modified.

FIG. 5 depicts an example allocation of GPUs among an example set of virtual machines. This allocation corresponds to the subset of VMs 430 indicated in FIG. 4 and illustrates how the different VMs are allocated to one of the two corresponding GPUs based upon how their resource requirements match the available resources of the two GPUs 510 and 520, available, for example, as part of server/host hardware 101 of FIG. 1. The VMs shown in FIG. 5 correspond to the rows 410-425 in the GAL 400, thus, some of the VMs, such as the VM represented by VM representation 510, are not allocated GPU resources. VM representations 501-508 correspond to the eight VMs in the subset of VMs 430 listed in the GAL 400 that are allocated GPU resources. As can be observed, the VMs are allocated GPU resources based upon availability—not necessarily in the order that they appear on the GAL 400. Accordingly, VM representations 501, 502, 503, and 507 are allocated GPU resources from the first physical GPU 530 and VM representations 504, 505, 506, and 508 are allocated GPU resources from the second physical GPU 520. In some embodiments, some portion of one or more of the GPUs will be available and not used if there is no VM that fits in the remaining portion. Also, in some embodiments, a VM further down in the ranked list may be allocated the remaining portion before others with higher GBFs if it fits and the other VMs higher on the ranked list do not. In other embodiments, VMs are not allocated GPU resources out of the ranked order.

In the allocation illustration 500, the VM identified by VM representation 509 is the next likely VM to be seated—receive an allocation of VM resources—if and when one of the other VMs identified by VM representations 501-508 is suspended, moved, closed, and/or unseated, for example, by having its VM changed, for example as a result of an assessment of its runtime profile or as a result of a changed priority. For example, the VM representations 501, 503, and 505 are indicated by dashed lines to indicate for one or more reasons that they are available to be unseated. (Their new GBFs are not shown.) One or more of these VMs may be unseated to allocate resources to a contender VM, such as the VM identified by VM representation 509. In this example, only one of these VMs available to be unseated would be unseated to address the needs of the contender VM identified by VM representation 509 because the contender VM only needs 256 MB, which are more than available from one of the VMs available to be unseated. Of note, if a VM can be unseated that would not yield sufficient GPU resources (for example, only would yield 128 MB of VRAM as opposed to the needed 256 MB), then the VM that could be unseated may not be unseated.

Although the examples described herein often refer to a GPU allocation list and GPU benefit factor, the techniques described herein can also be used to allocate other types of resources. In addition, the concepts and techniques described are applicable to other prioritization techniques. Also, although certain terms are used primarily herein, other terms could be used interchangeably to yield equivalent embodiments and examples. In addition, terms may have alternate spellings which may or may not be explicitly mentioned, and all such variations of terms are intended to be included.

Figure 7:
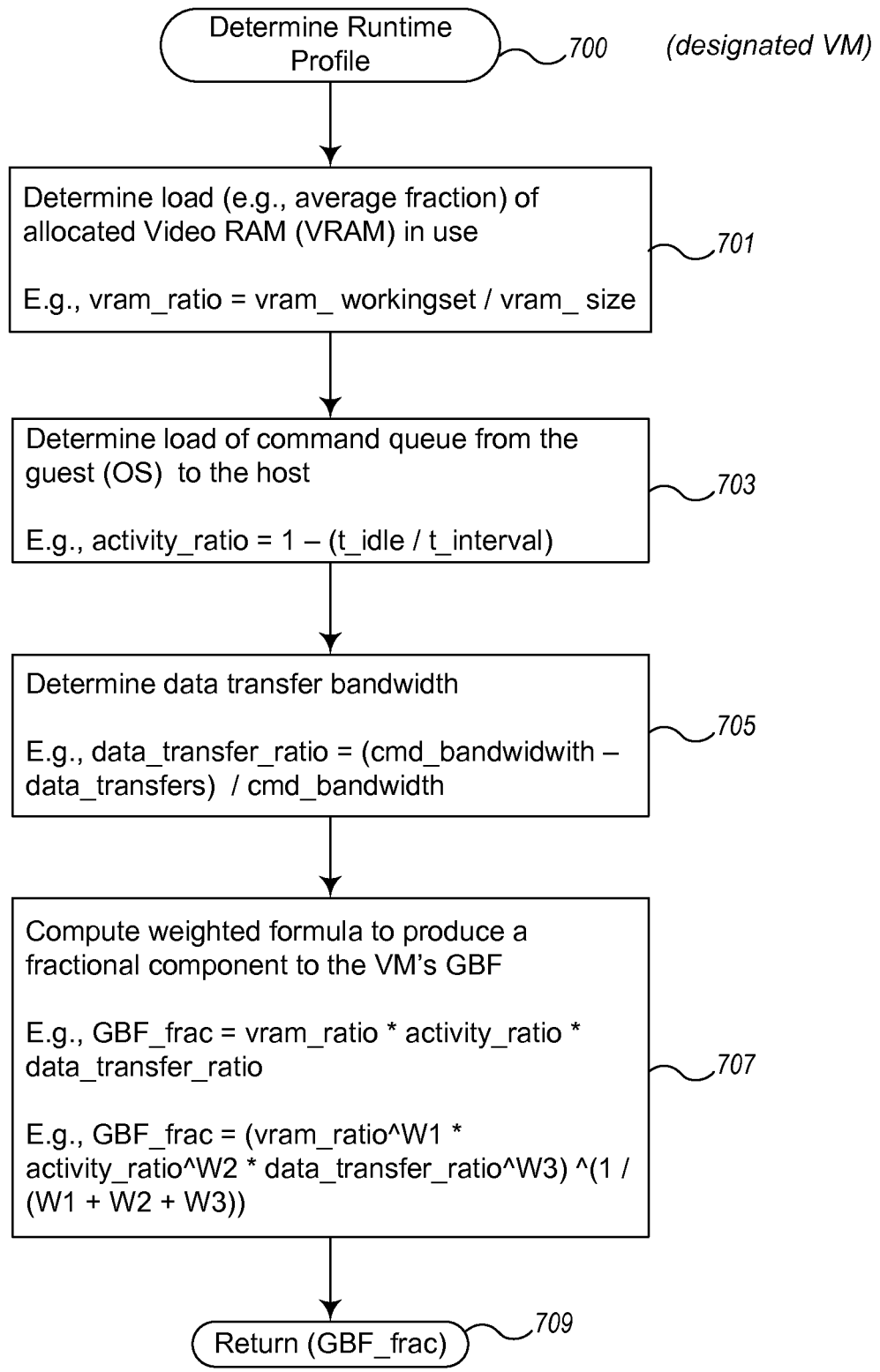
FIG. 7 is a flow diagram of example logic for determining a runtime profile of a designated virtual machine.
Figure 8:
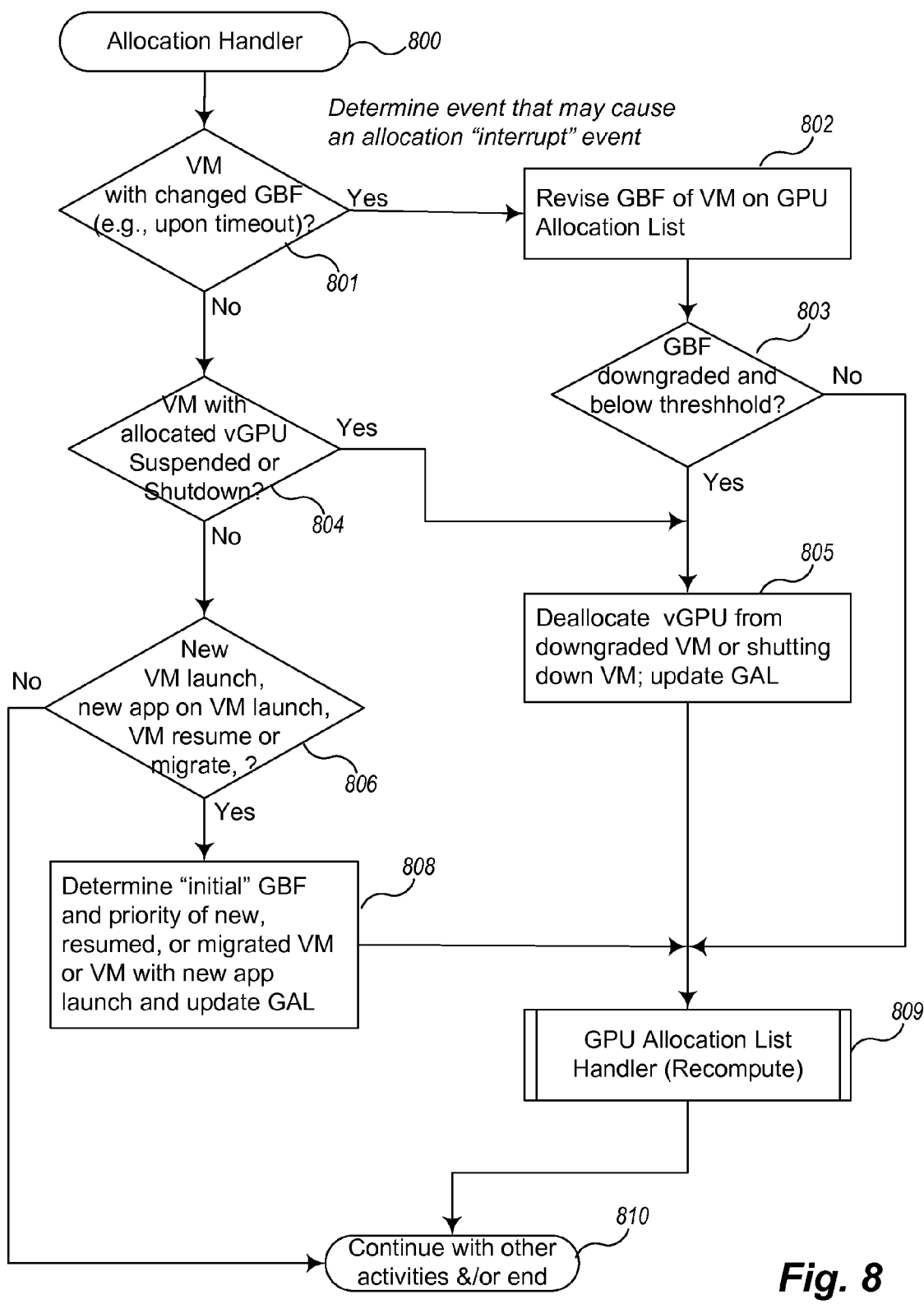
FIG. 8 is a flow diagram of example logic for handling events that cause a GPU benefit factor (GBF) to be set or changed for a designated virtual machine.

Example embodiments described herein provide applications, tools, data structures and other support to implement a GPU allocation system to be used to dynamically allocate GPU resources to one or more virtual machines. In the following description, numerous specific details are set forth, such as data formats and code logic sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like. For example, the separate handling of the determination of the GBFs and allocation/reallocation as depicted in FIGS. 6-8 may not be implemented as separate threads in a production implementation, but are so depicted for ease of description.

Figure 6A:
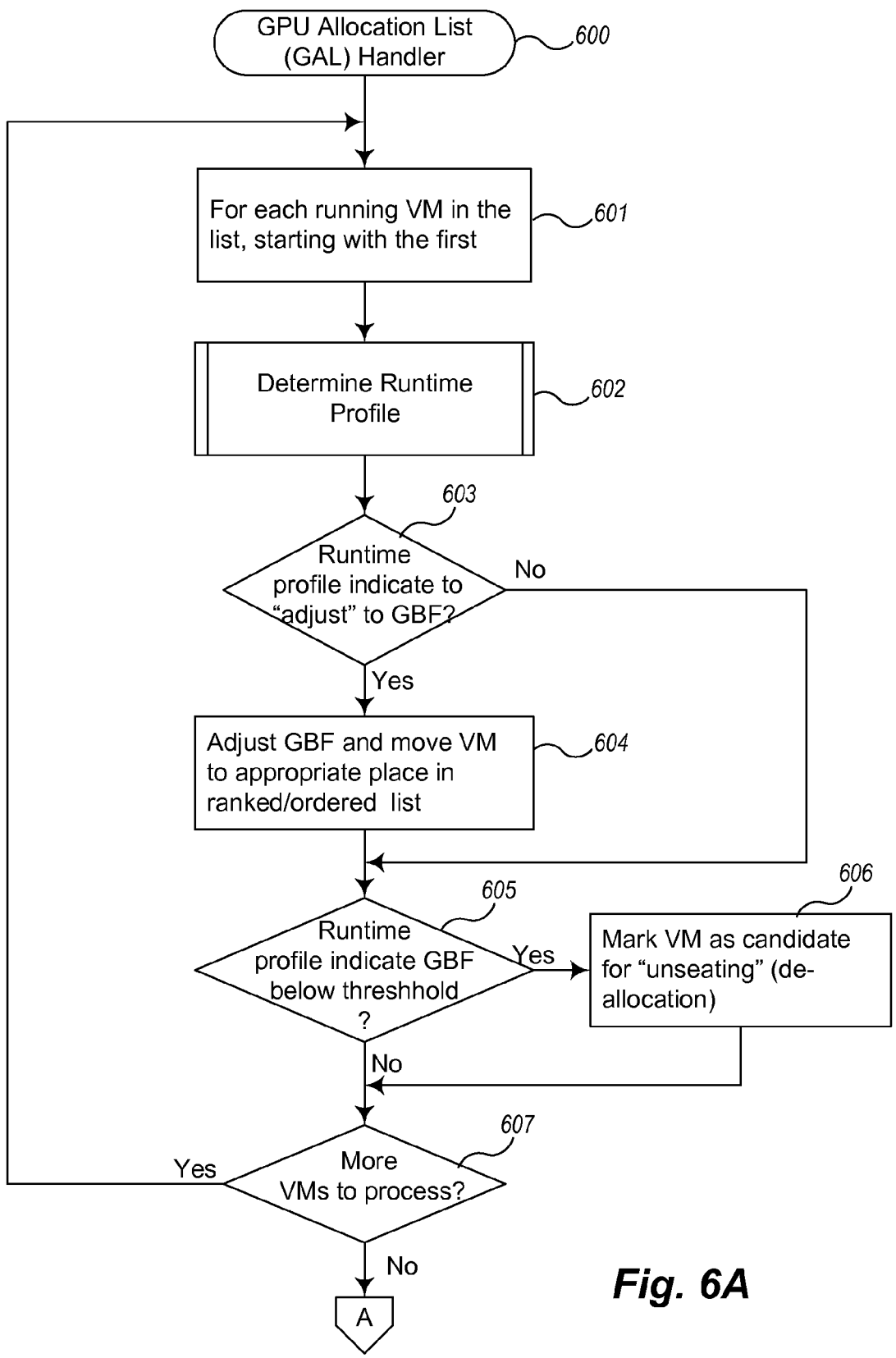
FIGS. 6A and 6B depict a flow diagram of example logic for managing a GPU allocation list and allocating GPU resources based upon the list.
Figure 6B:
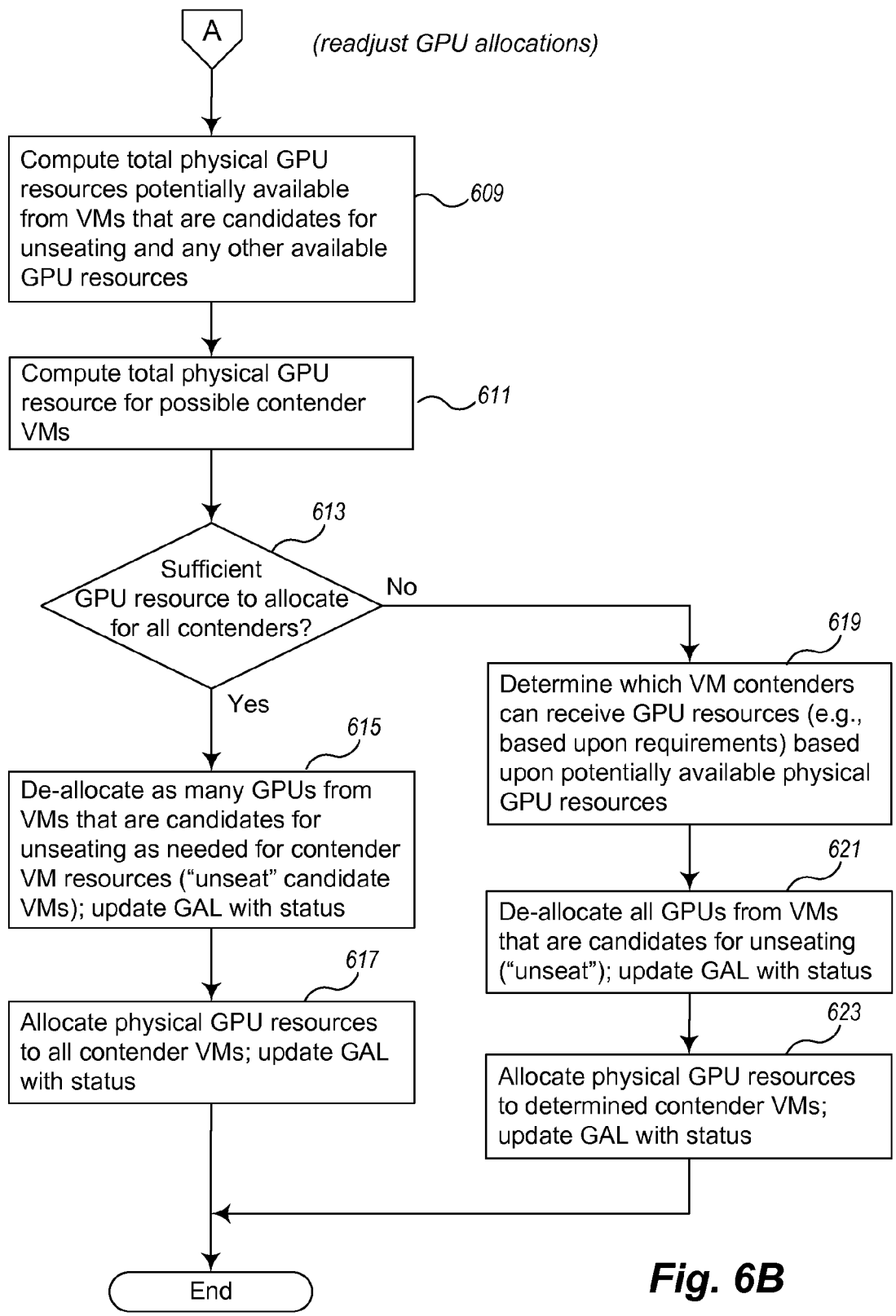

FIGS. 6A and 6B depict a flow diagram of example logic for managing a GPU allocation list and allocating GPU resources based upon the list. Logic 600 may be executed, for example, by the GPU allocation logic 203 of virtualization logic 203 running on the host/server 201 in FIG. 2. As described with reference to blocks 307 and 309 of FIG. 3, the GPU allocation list handler is responsible for managing the GAL (such as GAL 400 of FIG. 4) including updating the ranked list of VMs based upon runtime profiles and performing any reallocations of GPU resources based upon the updated GAL. Blocks 601-607 described example logic to implement updating the ranked list of VMs. Blocks 609-623 describe example logic to implement adjusting the GPU resource allocations.

Specifically, in block 601, the logic begins a loop to process each running VM in the GPU allocation list beginning with the first. In block 602, the logic executes additional logic described with reference to FIG. 7 to determine the current runtime profile for the current VM being processed. The runtime profiles of the VMs in the GAL are used to determine the most promising contender VMs (to seat next—i.e., to allocate GPU resources) and to identify which VMs have any actual low utilization of the GPU resources previously allocated to them. Since the GAL includes VMs that are potentials for GPU resource allocation, a current runtime profile is computed for each VM that is currently running on a CPU as well as each VM that is currently running on a GPU. In some embodiments, a runtime profile may be viewed as a "fractional" component of a GBF (computed once a VM has been executing); whereas the category of workload (3D, 2D, etc.) may be viewed as an "integer" component of a GBF. In this manner the runtime profile can be used to further distinguish two or more VMs with the same category (base) GBF.

In block 603, the logic determines whether it is necessary to downgrade or upgrade the GBF of the current VM being processed, for example, based upon whether the runtime profile determination has indicated that the current VM is using GPU relevant resources or processing a categorization of workload that is indicative that the current VM would benefit more or less from GPU resource allocations. If so, the logic continues in block 604, otherwise the logic continues in block 605.

In block 604, the logic adjusts the GBF of the current VM being processed. In embodiments that use the runtime profile as a fractional component, it can be added to the base component of the GBF to compute a total GBF. In other embodiments, where the GBF is changed to another category, a timeout mechanism may be used to downgrade or upgrade the GBF. For example, a downgrade of a GBF can be performed to downgrade a VM's GBF from a 3D type VM to a 2.5D type VM using a "no 3D commands" timeout (e.g., an alert or signal). Similarly, an upgrade of a GBF can be performed to upgrade a VM's GBF from a 2D type VM to a 2.5D type VM using a "use 2.5D commands" timeout. In other embodiments, an upgrade or downgrade of a GBF may be performed at other and/or different times.

In block 605, the logic determines whether the (perhaps new) GBF of the current VM being processed is below a particular threshold (within or above, depending upon how the threshold is defined), and, if yes, the logic continues in block 606, otherwise the logic continues in block 607. In block 606, the current VM being processed is marked as a candidate for unseating (de-allocation of GPU resources) as illustrated by the dashed line VM representations in FIG. 5.

A threshold value is used to prevent unnecessary context switches of VMs on a GPU where the benefit of GPU resource usage does not exceed the time required to perform the context switch. In some embodiments, the threshold value is a system configuration parameter that is predetermined. In other embodiments, the threshold value is varied depending upon load and performance of the DGAS.

In block 607, the logic determines whether there are additional VMs to process, for example, more VMs on the GAL, and if so returns to the beginning of the loop in block 601, otherwise continues processing in block 609.

Blocks 609-623 perform adjustments of the GPU resource allocation in view of the updates determined in blocks 601-607. In particular, block 609, the logic determines (e.g., computes) the total physical GPU resources potentially available for allocation based upon the candidate VMs marked for unseating in block 606 and any other available GPU resources. Additional GPU resources may be available, for example, from leftover GPU resource availability that was previously too small to be allocated to any of the VMs on the GAL (with their requirements as listed at the time of prior allocation).

In block 611, the logic determines (e.g., computes, receives, etc.) the total amount of physical GPU resources required for possible contender VMs such as the contender VM identified by VM representation 509 of FIG. 5.

In block 613, the logic determines whether there exist sufficient GPU resources to allocate for all contender VMs, and, if so, continues in block 615, otherwise continues in block 619. In block 615, the logic de-allocates as many GPU resources from VMs that are candidates for unseating as needed for all contender VMs, and updates the GAL with corresponding statuses. In block 617, the logic allocates the resultant GPU resources to all contender VMs by allocating hardware GPU resources to corresponding virtual resources (e.g., virtual GPUs) of (or allocating virtual resources if not already allocated to) those contender VMs, and updates the GAL with corresponding statuses. The logic 600 then ends.

In block 619 (when there are insufficient resources to allocate GPU resources to all contenders), the logic determines which contender VMs will fit on the potentially available GPU resources of marked VM candidates for unseating (as marked in block 606). In block 621, the logic de-allocates GPU resources from the VM candidates for unseating identified in the previous block 619, and updates the GAL with corresponding statuses. In block 623, the logic allocates the GPU resources just de-allocated in block 621 as needed for the contender VMs, and updates the GAL with corresponding statuses. The logic 600 then ends.

In some embodiments, the GBFs of VMs may be used to load balance across a server cluster. In this case VMs with a high priority and high GBF on a heavily loaded server GPU may be moved to servers with greater GPU resource availability. Also, a single VM may be accelerated on more than one GPU. In this case, when there is appropriate capacity on multiple GPUs (even across servers) then higher performance and better system utilization may be achieved by processing the workload (e.g., rendering the frames) of the VM in a distributed manner across the multiple GPUs. For example, the GPUs could parallel process alternating scan lines or different chunks of the VM's frame and then combine the results through a primary GPU or the CPU. The rendering support 205x in conjunction with the GPU allocation logic 203 of FIG. 2 may be used to accomplish this task. Hooks for the virtualization logic 202 may be provided to determine a GPU's load and available capacity to aid in organizing this distributed approach. Appropriate load balancing and distribution logic may be incorporated into the logic of FIGS. 6A and 6B.

FIG. 7 is a flow diagram of example logic for determining a runtime profile of a designated virtual machine. Logic 700 may be executed, for example, by the GPU allocation logic 203 of virtualization logic 203 running on the host/server 201 in FIG. 2 in combination with workload advisor/GBF factor reporting logic 206x and rendering support 205x for the designated VM that reports information used to compute the runtime profile. The logic 700 reflects one technique (algorithm, mechanism, etc.) for determining a runtime profile. Other techniques may be used and similarly incorporated into a DGAS. This logic is computed, for example, for each current VM being processed by the logic that maintains the GAL.

As illustrated, the runtime profile is determined based upon some metric of VRAM use, the type or amount of rendering (e.g., SVGA) commands used, and/or the amount of data transfers (e.g., graphics data transfers via DMA-direct memory access or other mechanism). In other embodiments, other measurements may be substituted, added, or modified. These factors are defined in such a way that they can be measured independently of whether the workload is being served by a GPU or by a CPU.

Accordingly, in block 701, the logic first determines a representation of load/amount of VRAM in use by the designated VM. Large VRAM utilization suggests that the VM has large models in local storage that are rendered repeatedly, which potentially benefits from a GPU resource allocation. A GPU's VRAM bandwidth is usually faster than CPU RAM's bandwidth, so moving workloads that consume more VRAM to a GPU (allocating hardware GPU resources to the VM) should benefit overall performance. One measure of this load is the average fraction of allocated virtual video RAM (VRAM). For example, equation (1) can be used for this determination:

$$vram\_ratio = vram\_workingset / vram\_size \quad (1)$$

where vram_workingset is the working set size of virtual VRAM used by the guest (e.g., the size of textures actually being frequently referred to in the command stream) and vram_size is the total size of the virtual VRAM allocated to the guest.

In block 703, the logic determines the load of the command queue (e.g., an SVA command queue, rendering command queue, etc.) from the guest OS to the host. For example, in FIG. 2, the VM Support 204a can determine the load of commands from guest OS 211 to the rendering support 205a. The load of the command queue is suggestive of the execution load of the VM. A mostly empty queue suggests that the VM process is waiting for commands. If this is a VM supported by a GPU, then the GPU is not likely being put to good use. If a workload is sporadic (idle a great deal of the time), then it may be advantageous to move the GPU resources from this VM (unseat the VM) to avoid unnecessary consumption of resources like VRAM during this idle period. Equation (2) can be used for this determination:

$$activity\_ratio = 1 - (t\_idle / t\_interval) \quad (2)$$

where t_idle is the amount of time the command queue is idle on a given interval of time t_interval. In some embodiments, instead of measuring the command queue, the amount of time a processing unit for handling graphics is idle is measured. The processing unit may be a virtual GPU or some other communications mechanism.

In block 705, the logic determines the portion of data transfers (e.g., DMA accesses, graphics data transfers, and the like) to the total command bandwidth. A high bandwidth use is suggestive that the data being processed is constantly changing and hence is frequently, if not constantly, being communicated from the guest to the VM. For example, textures and vertex data, and the like are constantly getting generated by the application and transmitted to the VM. PCI bus bandwidth (used to communicate between main memory and a GPU when the GPU resides on a separate card) is a limited resource, so workloads that do a lot of graphics data uploads and/or downloads to/from main memory may cause the PCI bandwidth to become a bottleneck if moved to a GPU. Accordingly, it may be preferable to leave such VMs executing on a CPU. Equation (3) can be used for this determination:

$$data\_transfer\_ratio = (cmd\_bandwidth - data\_transfers) / (cmd\_bandwidth) \quad (3)$$

where data_transfers include, for example, textures and vertex/index/constant buffers and cmd_bandwidth is the bandwidth of all commands.

These factors are defined in such a way that they yield values near 1 for situations favorable to hardware GPU allocations and values near 0 for situations favorable to software (CPU) support. For example:

vram_ratio of 1 means the workload is making full use of the VRAM and given that the GPU's VRAM is typically faster than system memory, it is more efficient to move or keep such a workload running on the GPU;

vram_ratio near 0 means the workload is not likely to benefit from a faster VRAM;

activity_ratio of 1 means the GPU has high utilization and therefore there is benefit in moving or keeping this workload on a GPU, given that a GPU's processing throughput is typically much higher than a CPU's;

activity_ratio near 0 means that the GPU is not heavily utilized (e.g, is not a bottleneck) and it is often idle, therefore, the workload cannot be significantly sped up by moving it to or keeping it on a GPU;

a data_transfer_ratio of 1 means that the communication to the GPU is dominated by commands, which can be sent very effectively across the PCI bus to the GPU; and data_transfer_ratio near 0 means that the communication to the GPU is dominated by data transfers such as containing graphics data, which cannot be virtualized well on a GPU as the PCI bus bandwidth is a scarce resource.

Together, these factors yield an estimate of how much benefit there is to move the workload of the designated VM to a GPU. In some embodiments, this measurement may be incorporated into the GBF of the designated VM as a fractional term. In some embodiments, the runtime profile may be used to cause the GBF to be decreased or increased via, for example, a timeout mechanism.

In block 707, the logic determines a weighted formula of the three above measurements to adjust the GBF of the designated VM.

One example weighted formula is described in equation (4):

$$GBF\_frac = vram\_ratio * activity\_ratio * data\_transfer\_ratio \quad (4)$$

which gives a value between 0 and 1, which can be incorporated into the GBF of the designated VM as a fractional term: GBF=GBF_base+GBF_frac. Used in this manner, the GBF would serve to distinguish between workloads with the same base GBF (by category). Note that the GBF_frac will tend to zero if any of its factors tend to zero.

Another weighted formula, based upon geometric mean, is described in equation (5):

$$GBF\_frac = (vram\_ratio^{W1} * activity\_ratio^{W2} * data\_transfer\_ratio^{W3})^{(1/(W1+W2+W3))} \quad (5)$$

This equation yields a fractional result in [0, 1], which tends to zero if any of its components tends to zero. The weights assigned depend on the system category (e.g., GBF_base=[1, 2, 3, 4, 5, 6]) and possibly particular configuration thereof. The weights may start with defaults (for example, based on benchmarks as part of system certification or configuration) and could be calibrated or improved using benchmarks on a specific system configuration.

FIG. 8 is a flow diagram of example logic for handling events that cause a GPU benefit factor (GBF) to be set or changed for a designated virtual machine. Logic 800 may be executed, for example, by the GPU allocation logic 203 of virtualization logic 203 running on the host/server 201 in FIG. 2. Although shown as separate logic from FIGS. 6A and 6B, which manages the GAL, it can be appreciated that the logic of FIG. 8 may be performed by one or more separate execution paths (e.g., threads) or the same execution path of the GAL handler.

The logic of FIG. 8 is currently shown to handle a certain set of events. Other or different events may be incorporated. Specifically, in block 801, the logic determines whether it has received a timeout event to adjust a GBF of an indicated VM. If so, then the logic continues in block 802, otherwise continues to process a different event in block 804. In block 802, the logic causes the GBF of the VM corresponding to the event to be revised on the GPU allocation list and continues in block 803. In block 803, the logic determines whether the GBF of the VM corresponding to the event has been downgraded and is below a certain threshold (above or outside depending upon how the threshold is defined) and if so continues to block 805 to de-allocate the VM, otherwise continues to block 809. As explained above, even if a GBF is downgraded to one which might otherwise be de-allocated, this is not done unless it falls below (or outside, etc.) a certain threshold so that context switches on a GPU are not performed without the ability to reap sufficient benefit.

In block 804, the logic determines whether it has received notification that a VM with already allocated GPU resources is to be shutdown or suspended. If so, then the logic continues in block 805, otherwise continues to process a different event in block 806. In block 805, the logic de-allocates the VM (but keeps track of the priority and GBF of the VM for potential resumes if the VM is being suspended) and updates the GAL accordingly. In some embodiments this results in a call to another thread responsible for the GAL. The logic continues to block 809.

In block 806, the logic determines whether it has received notification of a new VM launch, a new application launch on a VM, a VM resume, or a VM migrate (e.g., a vMotion event). If so, then the logic continues in block 808, otherwise continues to block 810. In block 808 the logic determines an "initial" GBF for the VM corresponding to the event and then continues to block 809. If the VM is a newly created VM, then the GBF and priority are determined as expressed above with reference, for example, to FIGS. 3 and 4. If, on the other hand, the VM has been migrated or resumed, then the GBF and priority of the VM last in effect when the VM was last running (before it was suspended or live moved) is used to provide an initial seat for the VM. This provides a "predictive" component to the GBF, because the prior history of the GBF is used to predict the needs of the VM when it is resumed or moved. Loading the VM on the GPU is performed as part of the resume/vMotion (live move) process and before its first frame is rendered, to avoid a disruptive context switch shortly after the VM begins serving its user interface. The GBF is universal across servers that run a compatible hypervisor and thus can be used when a VM is moved.

This predictive approach also may be used to smooth out the launching of new applications. For example, a 3D application typically loads its models (geometry, textures, and shaders) before rendering its first frame. An analysis of the graphics rendering commands (e.g., SVGA command queue) is sufficient to determine the GBF category (e.g., 3D, 2.5D, etc.) of the VM. Thus, a quick determination can be made to see if the newly loading application justifies a change in the GBF of the VM, hence its rank in the GAL, and possibly a GPU resource allocation. If so, the application (its VM) may be switched to use the GPU resources before this context loading phase and before the first frame is rendered. This avoids the disruption that would likely result if such a context switch were to occur shortly after the application's initiation of rendering.

In block 809 the logic causes the GPU allocation list handler to be invoked to recompute the rankings, markings of available VMs to unseat, and changes to allocations, and then continues to block 810.

In block 810 the logic continues with other activities and/or ends.

All of the above U.S. patents, U.S. patent application publications, U.S. patent applications, foreign patents, foreign patent applications and non-patent publications referred to in this specification and/or listed in the Application Data Sheet, including but not limited to co-pending applications entitled, "Dynamic Allocation of Physical Graphics Processing Units to Virtual Machines," Ser. No. 13/722,998; and "Managing a Data Structure for Allocating Graphics Processing Unit Resources to Virtual Machines," Ser. No. 13/723,021 both filed concurrently, are incorporated herein by reference, in their entireties.

From the foregoing it will be appreciated that, although specific embodiments have been described herein for purposes of illustration, various modifications may be made without deviating from the spirit and scope of the present disclosure. For example, the methods, techniques, and systems for performing video encoding for UI remoting discussed herein are applicable to other architectures other than an x86 architecture. Also, the methods and systems discussed herein are applicable to differing protocols, communication media (optical, wireless, cable, etc.) and devices (such as wireless handsets, electronic organizers, personal digital assistants, portable email machines, tablets, notebooks, game machines, pagers, navigation devices such as GPS receivers, etc.).

The invention claimed is:

1. A computer-implemented method in a server computing system for providing runtime assessments of a plurality of virtual machines for use in allocation of physical graphics processing unit (GPU) resources, including processing bandwidth, to one or more of the plurality of virtual machines comprising:
    dynamically determining a runtime assessment of workload for each virtual machine of the plurality of virtual machines, the workload runtime assessment indicative of a potential benefit that the virtual machine can receive from using a GPU resource of the physical GPU resources; and
    causing processing bandwidth of the physical GPU resources to be allocated to some of the plurality of virtual machines based upon the dynamically determined runtime assessments of workload, wherein the dynamically determined runtime assessment of workload for each virtual machine determines a combined value of processing parameters that are each indicative of benefit to using a GPU resource, and wherein:
    each virtual machine has a video RAM (VRAM) and wherein the processing parameters include a measure of VRAM usage, and wherein the measure of VRAM usage comprises an average ratio of the amount of the VRAM being used by the virtual machine to the total size of the VRAM allocated for the virtual machine;
    each virtual machine has a command queue and wherein the processing parameters include a measure of load of the command queue, and wherein the measure of load of the command queue comprises an amount indicative of time the command queue is active;
    at least some of the plurality of virtual machines have a processing unit for handling graphics and wherein the processing parameters include a measure of activity on the processing unit for handling graphics, and wherein the measure of activity comprises an amount of time the processing unit for handling graphics is idle over a particular time interval; or
    each virtual machine having VRAM, a command queue, and at least one data transfer mechanism, wherein the combined value of processing parameters comprises a combination of a value indicative of an amount of VRAM in use, a value indicative of an amount the command queue is utilized, and a value indicative of an amount of command bandwidth not using the data transfer mechanism.

2. The method of claim 1, further comprising:
    forwarding the dynamically determined runtime assessments of workload for the plurality of virtual machines to cause the plurality of virtual machines to be ordered based upon the indicated potential benefit of using a GPU resource determined for each virtual machine; and
    causing allocating of processing bandwidth resources of the physical GPU resources to some of the plurality of virtual machines according to the ordering by comparing the processing requirements of the some of the virtual machines to the available processing bandwidth of the physical GPU resources.

3. The method of claim 2 wherein the causing the plurality of virtual machines to be ordered based upon the indicated potential benefit is based in part upon the potential benefit and in part upon other factors.

4. The method of claim 3 wherein the other factors include a GPU benefit factor assigned to each virtual machine, the GPU benefit factor assigned based upon a predicted type of workload of the virtual machine.

5. The method of claim 3 wherein the other factors include a priority assigned to each virtual machine.

6. The method of claim 1, wherein each virtual machine has the command queue, wherein the processing parameters include the measure of load of the command queue and wherein the command queue is a virtual GPU command queue.

7. The method of claim 1, wherein at least some of the plurality of virtual machines have the processing unit for handling graphics, wherein the processing parameters include the measure of activity on the processing unit for handling graphics and wherein the processing unit for handling graphics is a virtual GPU.

8. The method of claim 1 wherein the processing parameters include a measure of processing performed not using a data transfer mechanism.

9. The method of claim 8 wherein the measure of processing performed not using the data transfer mechanism comprises a measurement of the amount of total command bandwidth performed not using the data transfer mechanism to the total command bandwidth.

10. The method of claim 1, wherein the processing parameters include a measure of processing performed not using a DMA transfer.

11. The method of claim 1 wherein the combined value of processing parameters comprises a weighted combination of processing parameters.

12. The method of claim 11 wherein the combined value yields a fractional component used in ordering the plurality of virtual machines for GPU allocation.

13. The method of claim 1 wherein the combined value comprises multiplying each processing parameter together.

14. The method of claim 1 wherein each processing parameter comprises a value between 0 and 1, where values near 1 indicate situations favorable to physical GPU resource allocations and values near 0 indicate situations favorable to CPU resource allocations.

15. A non-transitory computer-readable medium stored in a server computing system containing content for providing runtime assessments of a plurality of virtual machines for use in allocation of physical graphics processing unit (GPU) resources, including processing bandwidth, to one or more of the plurality of virtual machines by performing a method comprising:
    determining a runtime assessment of GPU favorable workload running on each virtual machine of the plurality of virtual machines, the workload runtime assessment indicative of a workable favorable to allocation of a GPU resource of the physical GPU resources;
    causing ordering of the plurality of virtual machines based upon the determined runtime assessments; and
    causing physical GPU resources to be allocated to some of the plurality of virtual machines based upon the ordering of the plurality of virtual machines by matching the processing requirements of the some of the virtual machines to available processing bandwidth of the physical GPU resources according to the ordering, wherein the determined runtime assessment of GPU favorable workload for each virtual machine determines a combined value of processing parameters that are each indicative of benefit to using a GPU resource, and wherein:

each virtual machine has a video RAM (VRAM) and wherein the processing parameters include a measure of VRAM usage, and wherein the measure of VRAM usage comprises an average ratio of the amount of the VRAM being used by the virtual machine to the total size of the VRAM allocated for the virtual machine;

each virtual machine has a command queue and wherein the processing parameters include a measure of load of the command queue, and wherein the measure of load of the command queue comprises an amount indicative of time the command queue is active;

at least some of the plurality of virtual machines have a processing unit for handling graphics and wherein the processing parameters include a measure of activity on the processing unit for handling graphics, and wherein the measure of activity comprises an amount of time the processing unit for handling graphics is idle over a particular time interval; or each virtual machine having VRAM, a command queue, and at least one data transfer mechanism, wherein the combined value of processing parameters comprises a combination of a value indicative of an amount of VRAM in use, a value indicative of an amount the command queue is utilized, and a value indicative of an amount of command bandwidth not using the data transfer mechanism.

16. The computer-readable medium of claim 15 wherein the medium is a memory of a computing system and the content is computer instructions stored in the memory.

17. The computer-readable medium of claim 15 wherein the processing parameters include a measure indicative of data transfers within the virtual machine.

18. The computer-readable medium of claim 15 wherein the combined value of processing parameters comprises a weighted combination of processing parameters.

19. A server computing system, comprising:
a memory;
a computer processor; and
virtualization logic, stored in the memory, and configured, when executed on the computer processor, to:
determine a runtime assessment of workload running on each virtual machine of the plurality of virtual machines, the workload runtime assessment indicative of a potential benefit that the virtual machine can receive from using a graphics processing unit (GPU) resource of physical GPU resources; and
cause processing bandwidth of the physical GPU resources to be allocated to some of the plurality of virtual machines based upon the determined runtime assessments of workload, wherein the determined runtime assessments each virtual machine comprises a combined value of processing parameters that are each indicative of a benefit to using a GPU resource, and wherein:

each virtual machine has a video RAM (VRAM) and wherein the processing parameters include a measure of VRAM usage, and wherein the measure of VRAM usage comprises an average ratio of the amount of the VRAM being used by the virtual machine to the total size of the VRAM allocated for the virtual machine;

each virtual machine has a command queue and wherein the processing parameters include a measure of load of the command queue, and wherein the measure of load of the command queue comprises an amount indicative of time the command queue is active;

at least some of the plurality of virtual machines have a processing unit for handling graphics and wherein the processing parameters include a measure of activity on the processing unit for handling graphics, and wherein the measure of activity comprises an amount of time the processing unit for handling graphics is idle over a particular time interval; or each virtual machine having VRAM, a command queue, and at least one data transfer mechanism, wherein the combined value of processing parameters comprises a combination of a value indicative of an amount of VRAM in use, a value indicative of an amount the command queue is utilized, and a value indicative of an amount of command bandwidth not using the data transfer mechanism.

20. The computing system of claim 19, further comprising:
a GPU allocation data structure, including an ordering of the plurality of virtual machines based upon the determined runtime assessments of work for each virtual machine of the plurality of virtual machines.

21. The computing system of claim 19 wherein the processing parameters include a measure indicative of data transfers within the virtual machine.

22. The computing system of claim 19 wherein the combined value of processing parameters comprises a weighted combination of processing parameters.

* * * * *